June 4, 1957  F. P. SCHÖNBERGER  2,794,712
APPARATUS FOR RECOVERING SULFUR FROM BLAST FURNACE SLAG
Filed Oct. 16, 1951

INVENTOR
FRIEDRICH PH. SCHÖNBERGER
BY Toulmin & Toulmin
ATTORNEYS

United States Patent Office 2,794,712
Patented June 4, 1957

2,794,712

APPARATUS FOR RECOVERING SULFUR FROM BLAST FURNACE SLAG

Friedrich Philipp Schönberger, Bensheim-Auerbach, Hesse, Germany

Application October 16, 1951, Serial No. 251,471

6 Claims. (Cl. 23—278)

Up to now it has not been possible to make the known methods of extraction of sulphur from blast furnace slag by injection of air into the molten slag economical.

The present method according to the invention avoids this defect in that by means of apparatus according to the invention the air in more or less finely distributed form is conducted through the slag against or in the direction of the flow of the slag. A longer contact time between the air and the slag is thus brought about which can be extended as desired. It is thus possible on the one hand to obtain high extraction of sulphur from the slag and on the other hand to enable a large quantity of oxygen from the air to be used as well as bringing about other advantageous chemical reactions.

One such possibility will be explained by way of example.

In the known method of air injection, the sulphur in the slag is vapourised as follows:

(1)     $2CaS + 3O_2 = 2CaO + 2SO_2 + 250$ heat units

However according to the new method this change definitely takes place more economically.

If the injected air mixture is sufficiently reduced and the column of slag is arranged sufficiently high above the blast nozzles, then the $SO_2$ as it is formed is further changed in rising through the slag column as follows:

(2)     $4Cas + 2SO_2 = 4CaO + 3S_2 + 74$ heat units

In this method other oxygen carriers, in gaseous, liquid or solid form, can also be used in order to eliminate any nitrogen content (3)     $CaS + H_2O = CaO + H_2S - 5$ heat units or to obtain other end products (4)     $2CaS + CO_2 = 2CaO + CS_2 - 8$ heat units or to increase the sulphur production or to make use of the slag heat (5)     $CaS + 3CaSO_4 = 4CaO + 4SO_2 - 173$ heat units
(6)     $3CaS + CaSO_4 = 4CaO + 2S_2 - 1$ heat unit
(7)     $2CaS + CaCO_3 = 3CaO + CS_2 - 35$ heat units Solid material such as $CaSO_4$ can also be recovered under certain conditions from the slag inlet. In most of these changes it is a necessary hypothesis that the oxygen supplied can be considerably limited without the sulphur production sinking to an uneconomic level. This is attained by the apparatus and measures according to the invention.

The blast furnace slag usually contains in addition some alkalis which can be changed in this method by steam or atmospheric moisture as follows:

(8)     $K_2O + H_2O = 2KOH + 15$ heat units
(9)     $Na_2O + H_2O = 2NaOH + 22$ heat units The boiling point of both hydroxides is between 1300 and 1400 degrees. At the existing slag temperature these compounds are more or less dissipated from the slag as a white vapour.

Research has shown that the construction of the injection nozzle with a plurality of small outlet holes taken from and thus approved in converter practice is not serviceable for the object desired on account of the entirely different chemical changes involved and thus the entirely different shape of blast chamber used. It has been found to be essential to provide that part of the chamber adjacent the blast arrangement of special shape.

Since the sulphur content of the blast furnace slag is only very small—at the most under 2 percent—it is necessary that each particle of slag is surrounded by the injected air stream and is thus constrained to take part in the chemical changes. That is possible only by jointly taking different measures.

First of all the cross section of the receptacle between the blast openings is given a more or less rectangular form. The blast openings are arranged in two oppositely extending sides of the rectangle—preferably in the two longer sides. It is thus possible to sweep over the entire rectangular cross section with the blast jets. Conveniently the blast openings can be oppositely disposed along the two longer sides, horizontally and vertically. The blast jets from one side then impinge intermediate the blast jets from the other side. The blast openings are preferably arranged in two rows, one above the other, or also in a plurality of rows, if this is necessary or desirable. In place of separate blast openings, a blast slit can also be used. Also slits which extend over the entire side of the rectangle.

On the other hand it is necessary for the whole of the oxygen in the injected blast to be brought into contact with the sulphur. Otherwise the liberating chemical reactions cannot proceed in the intended manner. This more or less complete contact between the oxygen and the slag or the sulphur in the slag is only possible if the surface of the injected blast jets is very large compared with the quantity of blast. This requires that the numerical ratio of the outlet cross section of the blast opening measured in square millimeters to the periphery of the cross section measured in millimeters should be maintained as small as possible. Research has shown that a preferred value for this ratio is 1.5. The plates are easily replaced and are cheaply made.

On the other hand however, if this numerical ratio is below its limit, the blast jets from the blast openings must still have the power to penetrate through the slag stream flowing past. It must still penetrate sufficiently deeply into the slag stream to surround all the slag particles. This essential deep penetration is in turn necessary over the length of the two sides of the rectangle. However this distance cannot be reduced in any way because the blast rising through the blast chamber should on the one hand spread through the entire cross section of the chamber above the blast inlet and on the other hand is permitted only a small flow velocity so that it does not impede the flow of slag and remains as long as possible in the slag bath.

All measurements relating to these necessarily opposing requirements can easily be ascertained with sufficient accuracy by research. They can thus be predetermined within definite limits by known calculations.

These joint measures can also be used alone or together with others. However only partial results will then be obtained.

Preferably the blast jets flowing into the slag bed slope obliquely from below. The period during which the blast is within the slag bed is thereby increased and also the mixing is improved. On the other hand the slag is prevented from penetrating into the blast openings.

The blast arrangement according to the invention is illustrated in the drawing.

Figure 1:
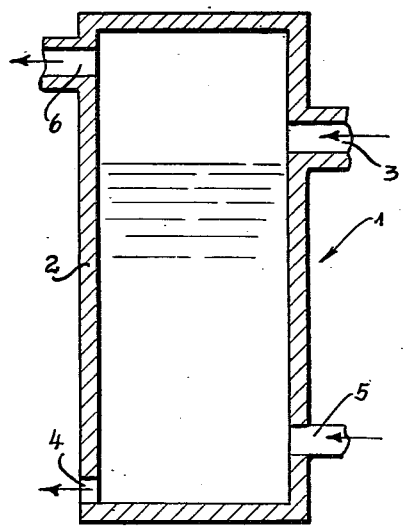
Fig. 1 is one simple embodiment of the blast arrangement.

The blast chamber according to Fig. 1 is a closed receptacle with a lining 2, a slag inlet 3 and a tapping 4, while the air blast enters at 5 and leaves at 6. This receptacle embodies the inventive idea quite generally.

Figure 2:
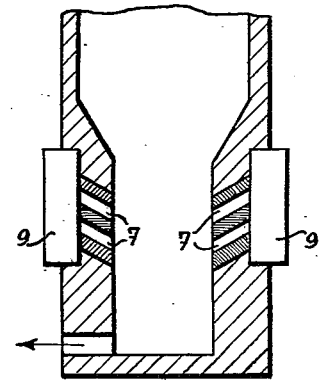
Fig. 2 shows a blast arrangement of substantially rectangular cross section with the blast openings in longitudinal section.
Figure 3:
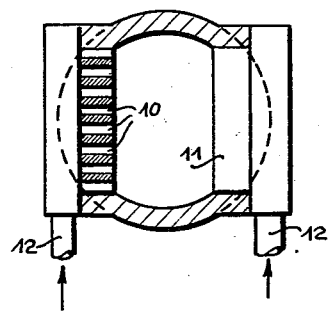
Fig. 3 is a cross section of Fig. 2.

Figs. 2 and 3 show in two sections the improvement of the lower part of the blast chamber with approximately rectangular cross-section whereby a contraction of the cross section of the slag column takes place. A series of apertures or slots 7 are provided in the wall on one side and on the opposite side another series of slots 7 is arranged, both series of which lead to the air chamber 9 which communicates with the blast line 12.

The blast openings slope towards the base and can be arranged in a plurality of rows differently transposed one above another.

Figure 4:
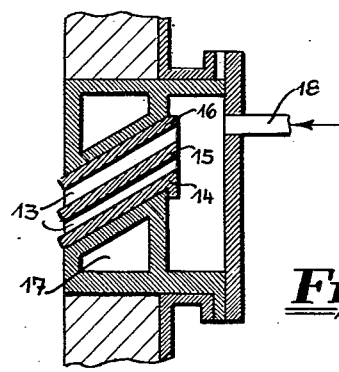
Fig. 4 shows another embodiment of an injection nozzle for the air blast.

In Fig. 4 the inlet opening for the air blast is further improved by the provision of a plurality of sloping, round or flat slots 13 which are formed by three plates 14, 15, 16 which are built into the water-cooled body 17 of the blast chamber. The blast is taken in through the connecting pipe 18.

I claim:

1. An apparatus for recovering sulphur from a molten melt such as blast furnace slag comprising: a vertical container, means for supplying the slag at the upper end of the container and withdrawing from the lower end of the container, said container having a region of substantially rectangular cross-section intermediate said means for supplying the slag and the means for withdrawing the same, and means comprising air jets arranged on only two opposite longer sides of said rectangular region of the container adjacent the lower end thereof for supplying air under pressure to the slag, each said jet being characterized in that its cross-sectional area in square millimeters divided by the circumference thereof in millimeters is not greater than five, the jets on one side of the rectangular region positioned to direct jets of air into said container intermediate the jets of air delivered from the jets on the other side of said region to enable the air to penetrate the entire cross section of slag in said region, and there being means at the upper end of the container above the inlet for slag for withdrawing the sulphur laden air.

2. An apparatus for recovering sulphur from a molten melt such as blast furnace slag comprising: a vertical container, means for supplying the slag at the upper end of the container and withdrawing from the lower end of the container, said container having a region of substantially rectangular cross-section intermediate said means for supplying the slag and the means for withdrawing the same, and means comprising horizontal rows of air jets arranged on only two opposite longer sides of said rectangular region of the container adjacent the lower end thereof for supplying air under pressure to the slag, the rows of jets on one side of said region positioned intermediate the rows of jets on the other side of said region, each said jet being characterized in that its cross-sectional area in square millimeters divided by the circumference thereof in millimeters is about 1.5, and there being means at the upper end of the container above the inlet for slag for withdrawing the sulphur laden air.

3. In an apparatus for recovering sulphur in the form of free sulphur from a molten melt such as blast furnace slag; a vertical container, means adjacent the upper end of the container for supplying slag thereto, means adjacent the lower end of the container for withdrawing slag therefrom, the lower end of the container being formed to a rectangular configuration, and a plurality of air jets distributed along two opposite sides of the rectangular portion of the container, the other two sides of said rectangular portion being free from jets, each jet being supplied with air under pressure so that the air penetrates substantially the entire cross-section of the slag and then rises therethrough, means at the top of the column of the container for withdrawing sulphur laden air therefrom, and each jet being characterized in that its cross-sectional area in square millimeters divided by its circumference in millimeters is not greater than five, said jets being positioned in horizontal rows with rows on opposed sides being arranged intermediate each other and the individual jets in corresponding opposed rows also being arranged intermediate each other to enable air to penetrate the entire cross section of slag in said region.

4. An arrangement according to claim 3 in which the said jets are provided by a plurality of parallel plates inclined downwardly toward the center of the container.

5. An arrangement according to claim 4 in which the said plates are mounted in a box-like holder having means for passing cooling water about the plates.

6. An apparatus for the removal of gasifiable substances, particularly sulphur, from molten melts, particularly blast furnace slag, through the introduction into the slag of a gaseous medium containing oxygen comprising: a generally vertically arranged closed slag container, an inlet for molten slag at an upper part of said container and an outlet for slag at the bottom part of said container, said container being generally rectangular in the region adjacent the bottom thereof, means adjacent the bottom of said container above the said outlet forming nozzle means for the admission of oxygen bearing gas into said container under pressure, said nozzle means being provided in only two opposite sides of said generally rectangular region, and being characterized in that the ratio of area of the cross-section through the total blast nozzle area in square millimeters to the circumference of the total blast nozzle area expressed in millimeters is not larger than 5, said nozzle means being arranged in diametrically opposite locations in said container with nozzle means on one side being arranged intermediate the nozzle means on the other side, and hood means above the inlet of the container for conducting therefrom flue gas escaping from the melt.

References Cited in the file of this patent

UNITED STATES PATENTS

| 81,561 | Truesdale | Aug. 25, 1868 |
| 133,718 | Pattison | Dec. 10, 1872 |
| 587,068 | Stickney | July 27, 1897 |
| 635,652 | Canavan | Oct. 24, 1899 |
| 1,611,704 | Zippler | Dec. 21, 1926 |
| 1,795,705 | Benner et al. | Mar. 10, 1931 |
| 2,029,307 | Campbell | Feb. 4, 1936 |
| 2,138,214 | Shiffler | Nov. 29, 1938 |
| 2,471,776 | Reece | May 31, 1939 |